8804X
W. Denson,
Straw Cutter.
Patented May 2. 1885.
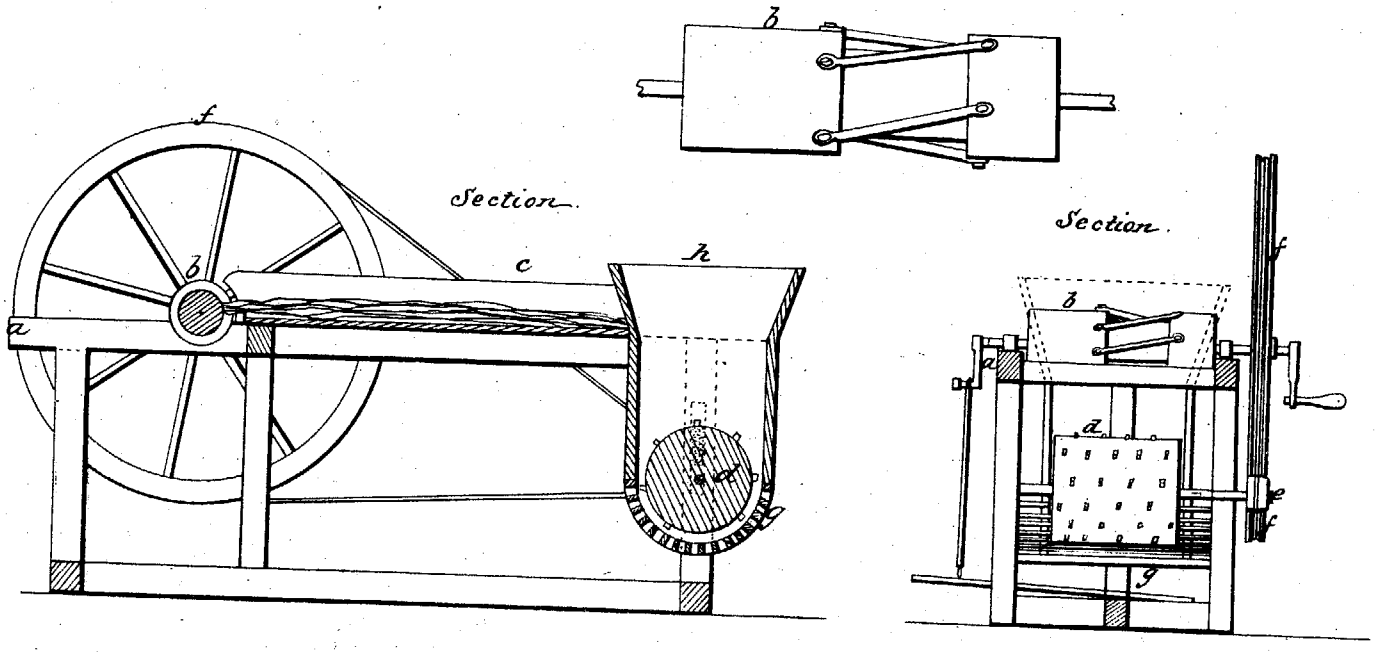

aw 13

8804X May 2. 1835 423.

William Denson
Letters Patent

The schedule referred to in these Letters Patent and making part of the same containing a description in the words of the said William Denson himself of his improvement in the machine for cutting Straw and Shelling Corn To all to whom these presents shall come. Be it known that I William Denson of Centre Spring in the county of Morgan and State of Alabama have invented a new and useful improvement in the machine for cutting straw and shelling corn and that the following is a full and exact description of the construction and operation of the said machine as invented or improved by me.

This machine consists of two parts viz. a straw-cutter and a corn sheller, the construction of which is as follows. An oblong frame eight feet long and two feet six inches wide is placed on four legs, two at each end within six or eight inches from the ends of the frame, these legs are two feet six inches high. Two pieces of timber are framed into the legs at the bottom at each end of the frame to which is attached a sill extending from one end of the frame to the other and in the middle the timber in this frame is three by four inches. The Straw Cutter — A cylinder of wood two feet long and eight inches diameter (provided with iron gudgeons at each end that work into metal boxes let into each side of the frame) is placed within two feet from one end of the frame. One part of the cylinder (eight inches in length and six inches from one end) is reduced to six inches diameter. The knives that cut the straw are screwed on the cylinder obliquely over that part which is reduced in diameter. Each end of the cylinder is provided with a crank one worked by a treadle and the other by hand. On the sill before mentioned is an upright which rises to the height of the legs on the top of which is placed a cross piece that extends to and is mortised in the side of the frame two inches from the cutting cylinder. The straw or feeding box is made in the usual way having a plate of steel on the face that goes against Drawing made

8804X gainst the cutters. this box is fastened to the cross piece just mentioned and extends to the other end of the frame above the corn sheller as will be seen hereafter. The corn sheller. A wooden cylinder sixteen inches long and fourteen diameter is put into an iron ax box which extends across the machine. The gudgeons of this cylinder work in metal boxes that slide up and down in grooves cut in to the legs. Each of the boxes has a strong spiral spring which presses them down. The intention of which is to enable the cylinder to accomodate itself to diferent size ears of corn. Iron pins are driven into the cylinder leaving a portion of them out of half an inch long half an inch wide and three sixteenths thick. On this cylinder is a whirle four inches diameter worked by a band from a wheel of four feet diameter which is on the cylinder of the straw cutter. Under the cylinder there is a semicircular box or concave two inches larger than the cylinder so as to leave a space of one inch between it and the cylinder. This box is made by placing a bar of wood two inches thick on each side and eighteen in width. the semicircle is continued by placing bars of iron half an inch apart. The hopper is errected above the cylinder and passed through that part of the feeding box of the straw cutter which (as was before stated) extends over the corn sheller. The machine is operated in the following manner it can be worked either by hand or with a treadle. When the crank is turned being on the axis of the cylinder of the straw cutter it causes the knives to come in contact with the straw in the box which must be pushed forward by hand, the four foot wheel which being on the same cylinder also revolves and as it is connected by means of a band to the wheel on the shelling cylinder it makes it revolve with great rapidity. The corn is dropped into the hopper it falls and comes in contact with the teeth on the cylinder and is shelled. What I claim as new and as my improvement is the combination of a straw cutter and corn sheller in the same machine. In testimony that the above is a full and exact description 8804X 425.

oription of the construction and operation of my machine as in-
ntea or improved by me I have hereunto set my hand this
ixteenth day of January in the year of our Lord one thousand
ight hundred and thirty five William Denson witnesses
A. G. Beach-n
H. A. Garrison Exd
M.G.C.

171 words